April 10, 1934.     W. C. ULINE     1,954,545
METHOD OF MAKING A STEPLADDER
Filed Dec. 15, 1930     8 Sheets-Sheet 1
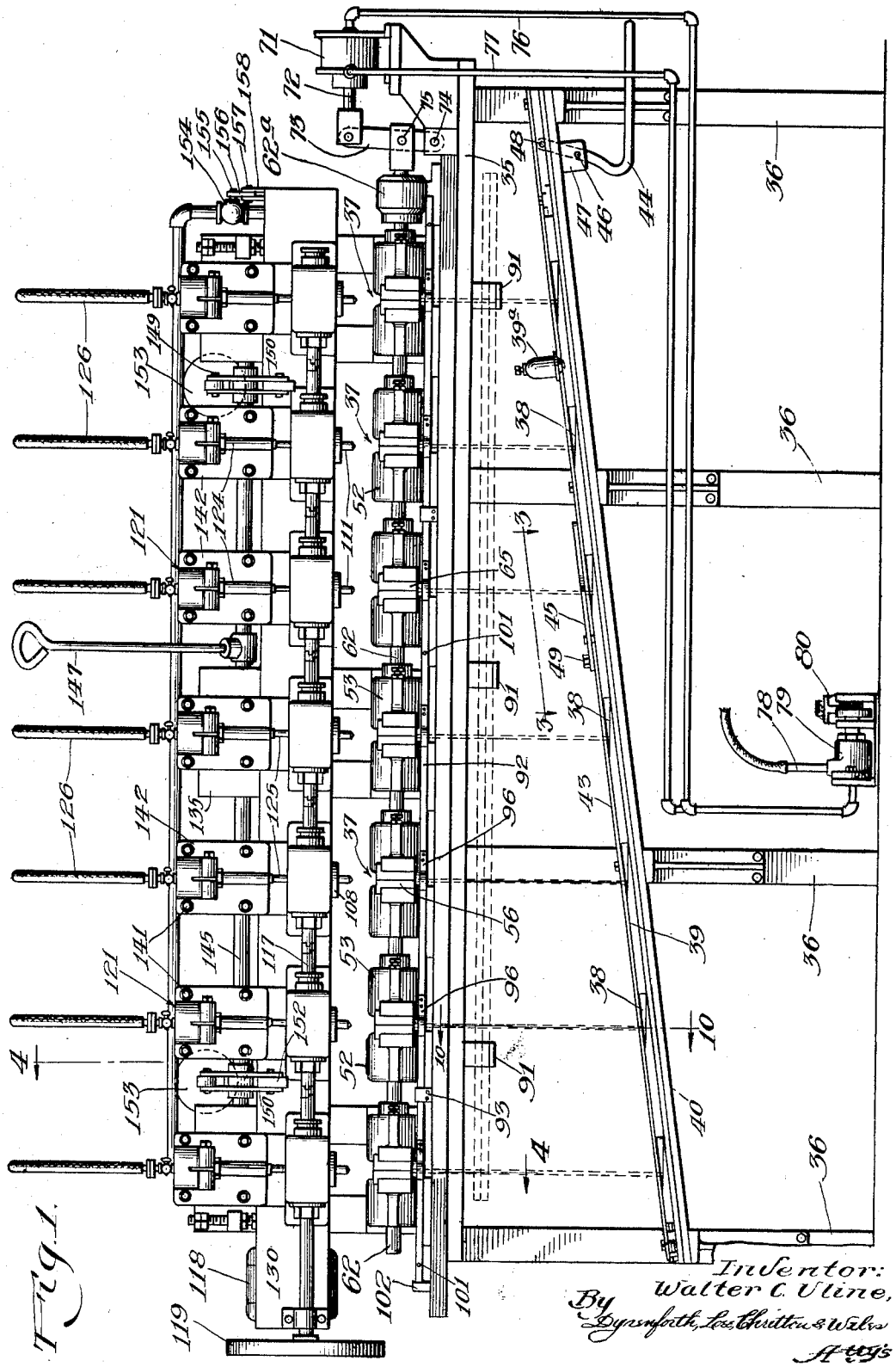
Inventor:
Walter C. Uline,
By Dynrenforth, Lee, Chritton & Wiles
Attys

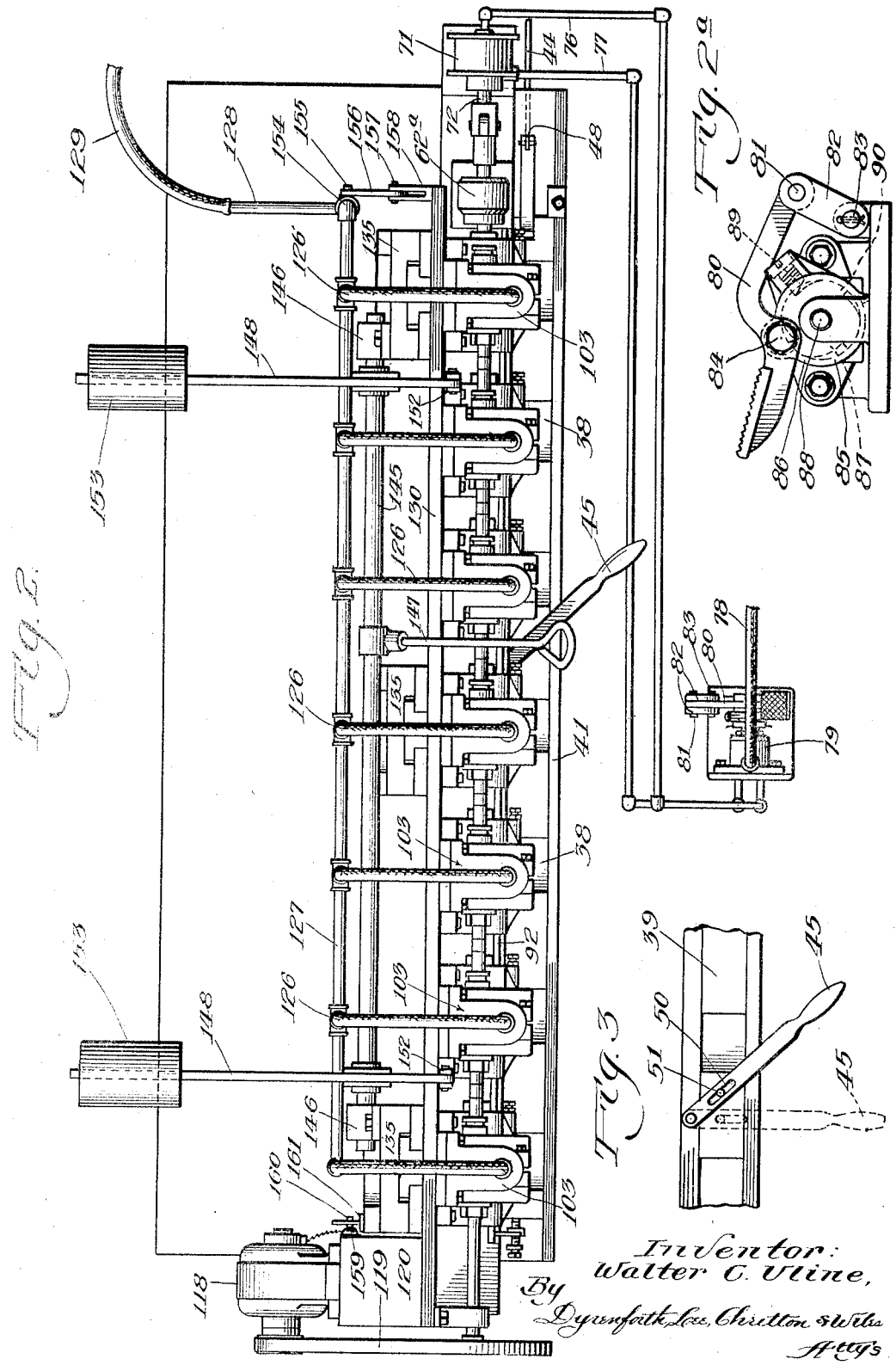

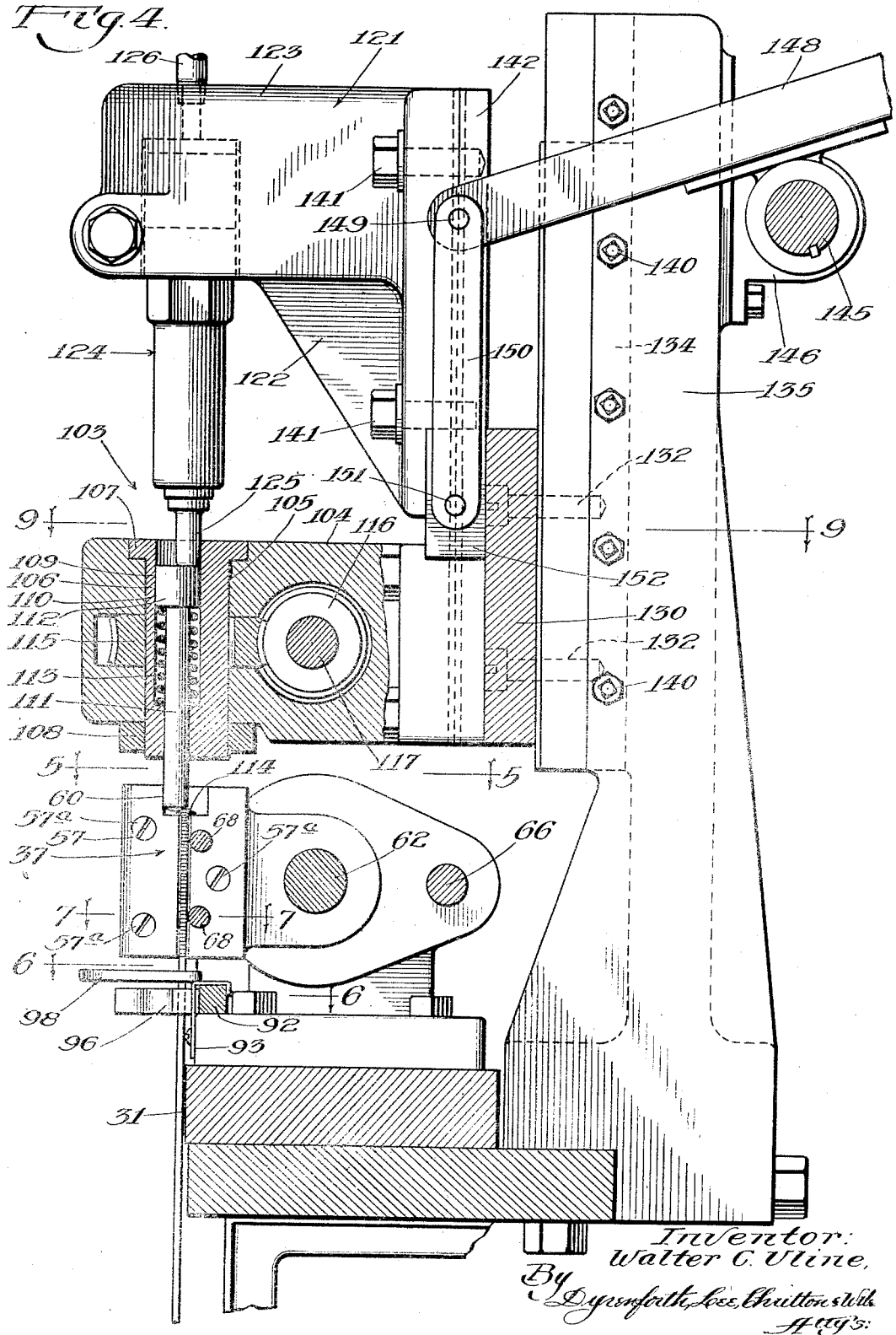

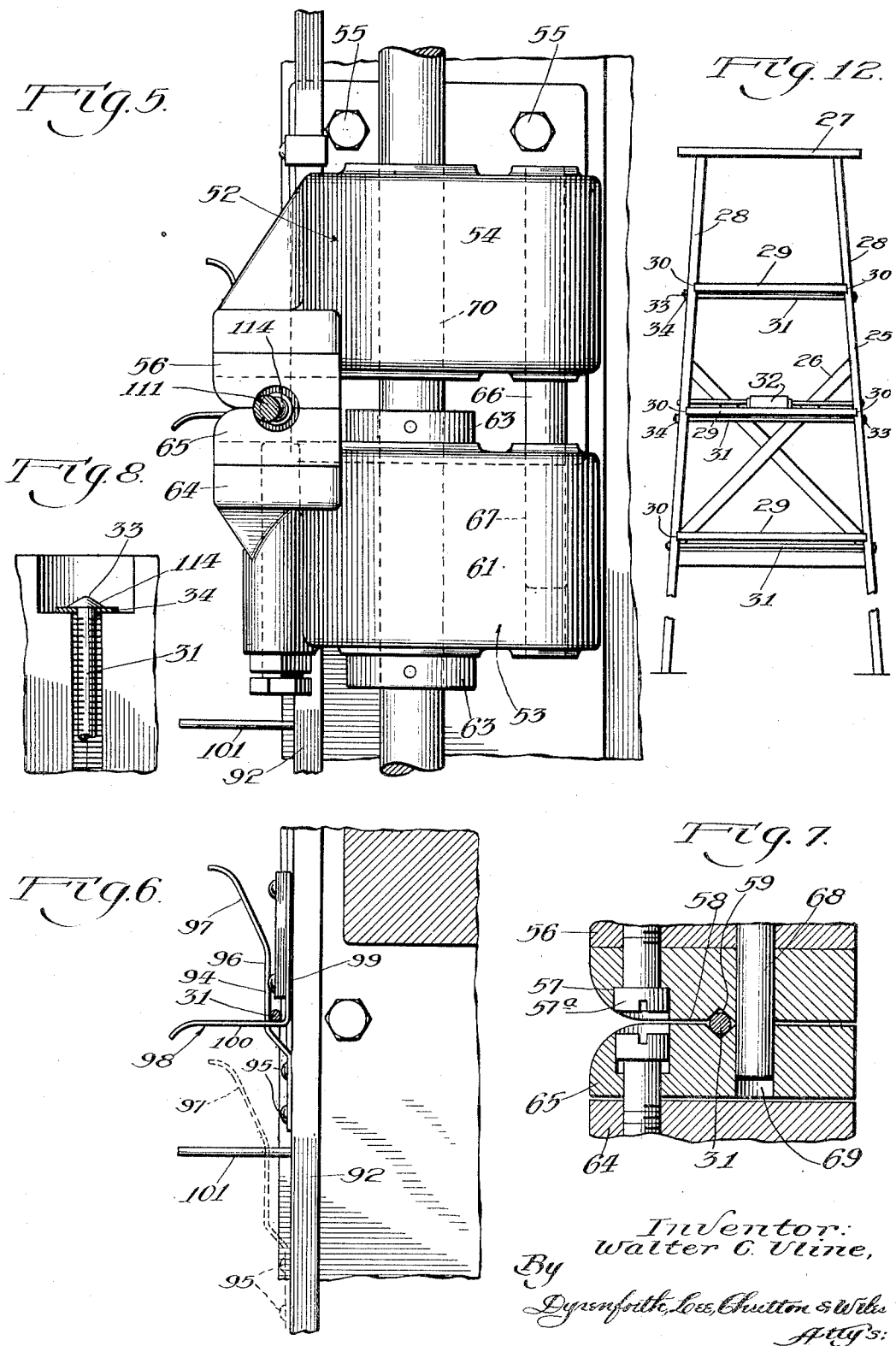

April 10, 1934. W. C. ULINE 1,954,545
METHOD OF MAKING A STEPLADDER
Filed Dec. 15, 1930   8 Sheets-Sheet 5
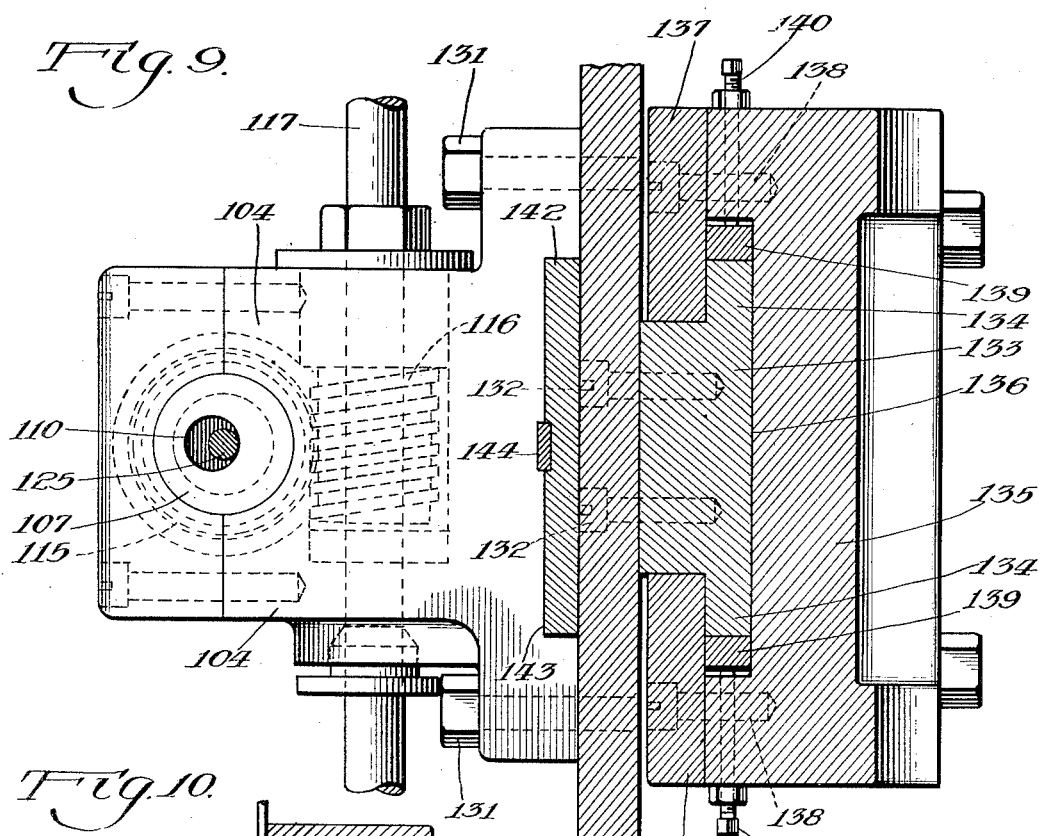
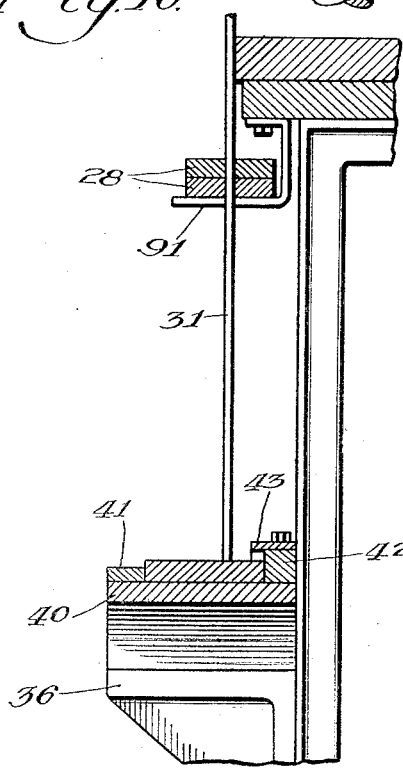
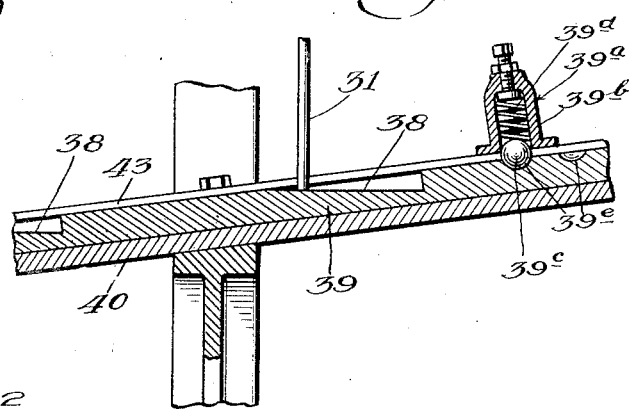
Inventor:
Walter C. Uline,
By Dynrenforth, Lee, Chritton & Wiles
Atty's

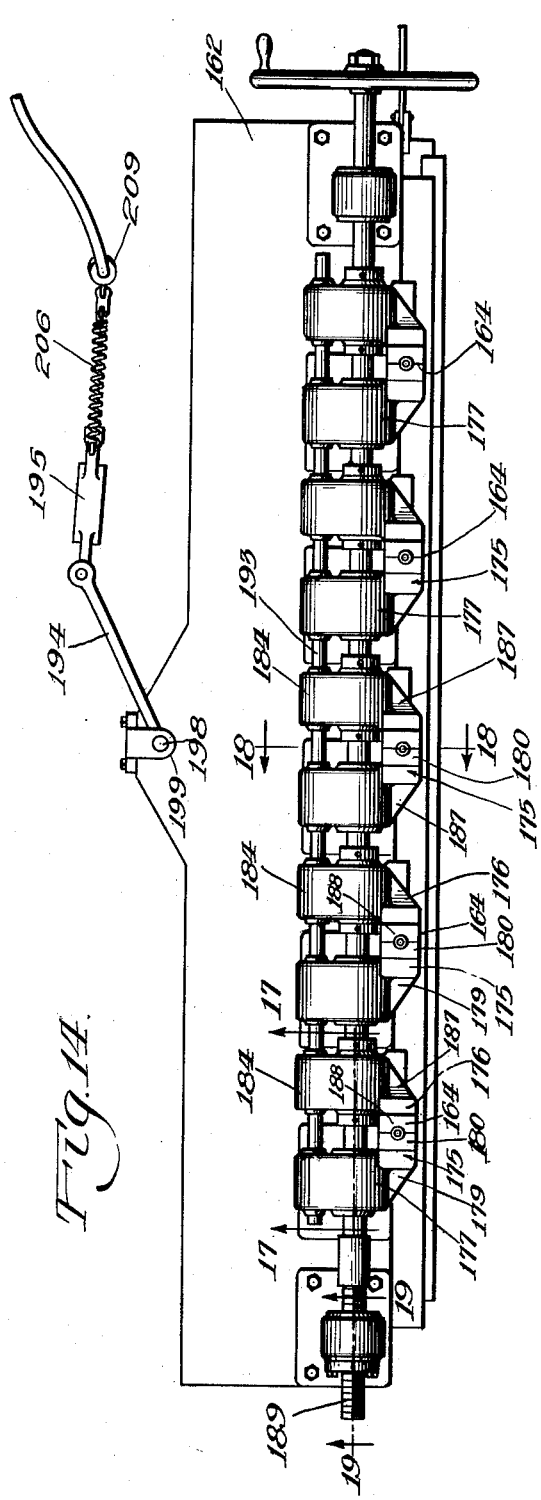
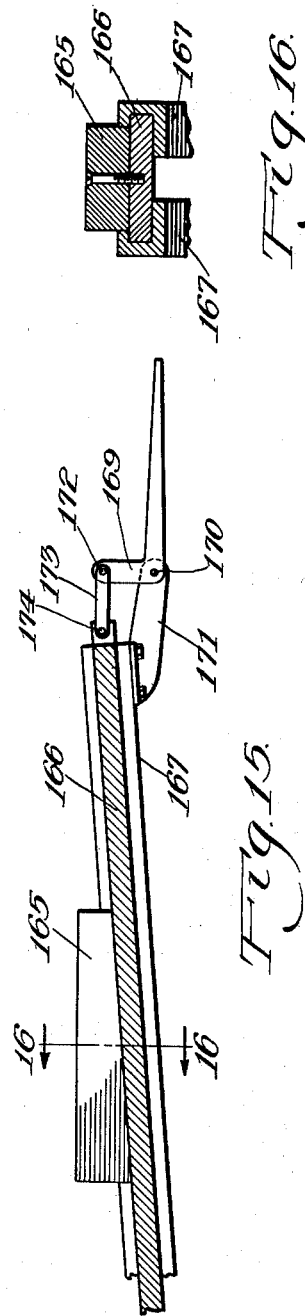

April 10, 1934.  W. C. ULINE  1,954,545
METHOD OF MAKING A STEPLADDER
Filed Dec. 15, 1930   8 Sheets-Sheet 8
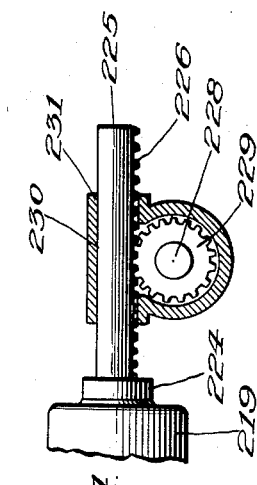
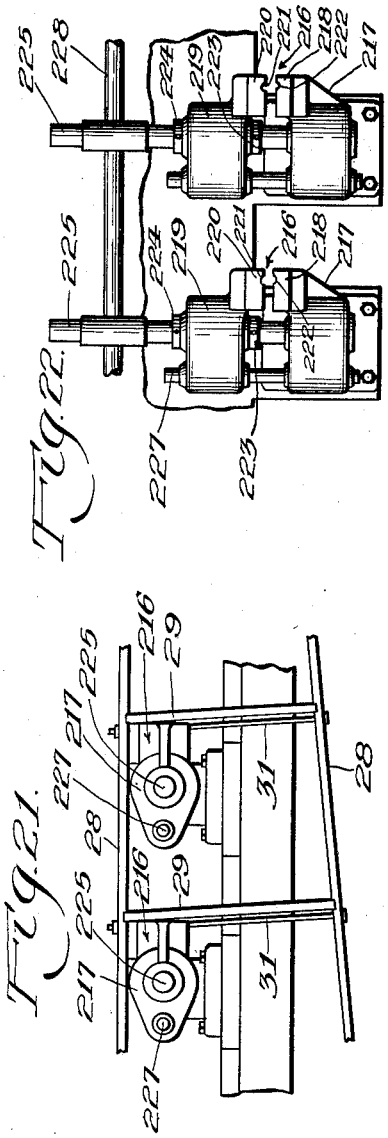
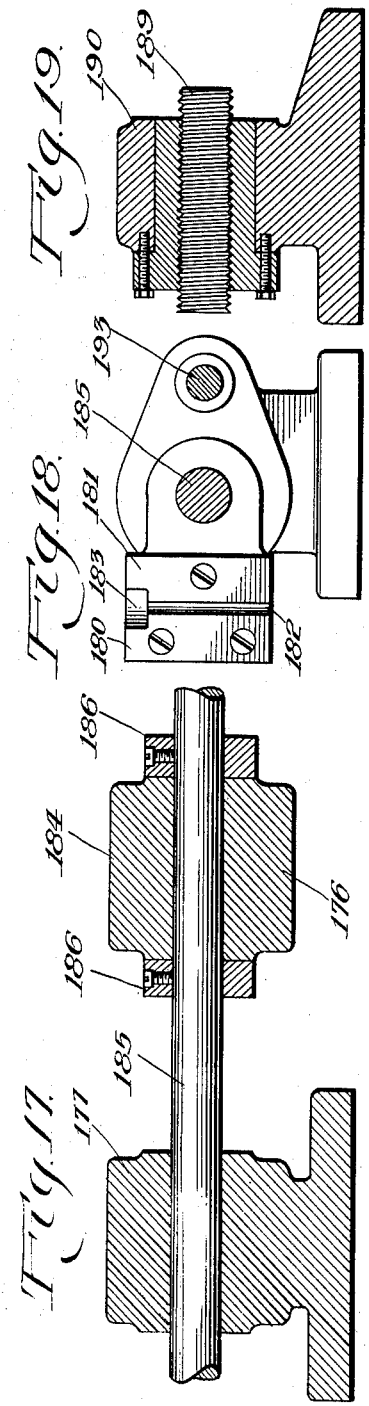
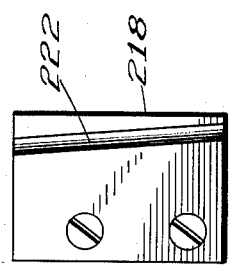
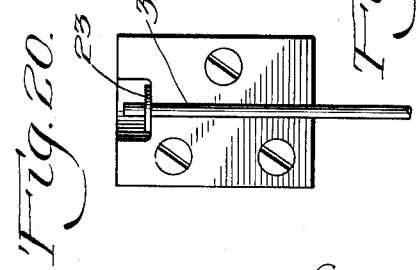
Inventor:
Walter C. Uline,
By Dyrenforth, Lee, Chritton & Wiles
Attys Patented Apr. 10, 1934

1,954,545

UNITED STATES PATENT OFFICE 1,954,545

METHOD OF MAKING A STEPLADDER

Walter C. Uline, Nappanee, Ind.

Application December 15, 1930, Serial No. 502,548

5 Claims. (Cl. 29—148)

The invention relates more particularly to a method of manufacturing step ladders the sidebar frames of which have connected therewith tension elements for preventing spreading of said frames.

One of the objects of the invention is to provide for the manufacture of structures of the general character above referred to with greater economy.

Another object is to provide for the tying together, for the purpose stated, of the elements referred to and particularly in the case of the side bar frames of a step-ladder, with greater rapidity; and other objects as will be understood from the following description.

Referring to the accompanying drawings:

Figure 1 is a view in side elevation of a machine of a construction suitable for practicing the new method.

Figure 2 is a plan view of the machine of Fig. 1.

Figure 13:
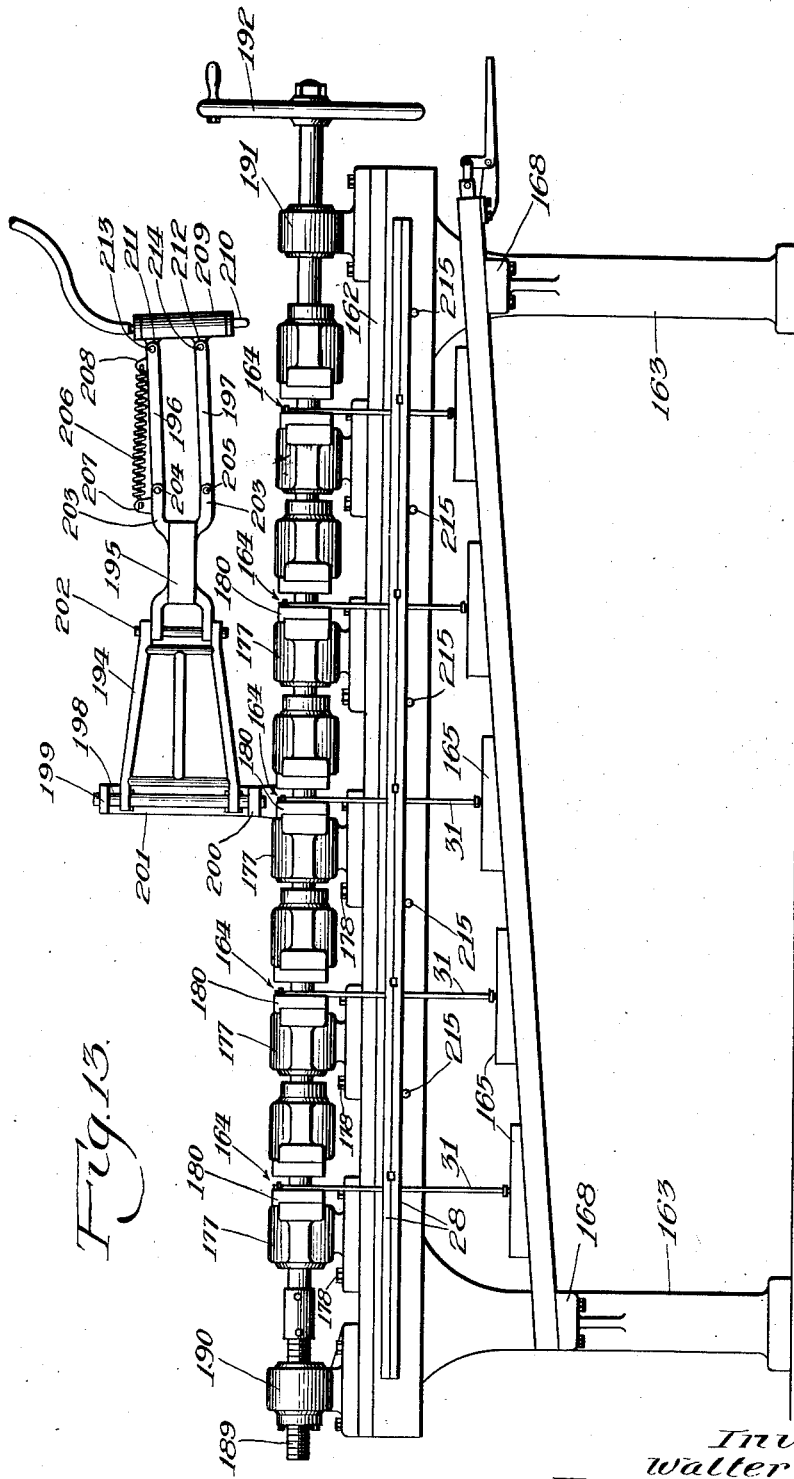

Figure 2ᵃ is a view in end elevation of treadle-operated valve mechanism forming a part of the mechanism of Fig. 1.

Figure 3 is a plan view of the abutment device for the wire-sections from which the tension elements are formed, the structure being viewed at the line 3—3 on Fig. 1 and in the direction of the arrows.

Figure 4 is an enlarged section taken at the irregular line 4—4 on Fig. 1 and viewed in the direction of the arrow.

Figure 5 is a broken plan section taken at the line 5—5 on Fig. 4 and viewed in the direction of the arrows.

Figure 6 is a broken plan sectional view taken at the line 6—6 on Fig. 4 and viewed in the direction of the arrows.

Figure 7 is a plan sectional view taken at the line 7—7 on Fig. 4 and viewed in the direction of the arrows.

Figure 8 is a broken face view of one of the pair of similar sections of which each of the clamp devices forming elements of the machine is comprised, this view showing a tension rod the upsetting of one thereof having been effected.

Figure 9 is a plan section taken at the line 9—9 on Fig. 4 and viewed in the direction of the arrows.

Figure 10 is an enlarged section taken at the line 10—10 on Fig. 1 and viewed in the direction of the arrows.

Figure 11 is a broken, enlarged, sectional view of the adjustment abutment device for the rods the ends of which are to be upset.

Figure 12 is a broken face view of a step-ladder the assembly of the tie, or tension, rods thereof being effected by the machine of the preceding figures and in accordance with the novel method.

Figure 13 is a view in side elevation of another form of machine constituting another structure by which the improved method may be practiced, the machine being shown assembled with the parts of a step-ladder leg to be united by the machine.

Figure 14 is a plan view of the machine of Fig. 13.

Figure 15 is a broken view in vertical sectional elevation of a detail of a mechanism forming anvils against which the rods to be upset for forming the tensioning, or tie, members of the latter, are caused to bear.

Figure 16 is a section taken at the line 16—16 on Fig. 15 and viewed in the direction of the arrows.

Figure 17 is an enlarged broken section taken at the line 17—17 on Fig. 14 and viewed in the direction of the arrows.

Figure 18 is an enlarged section taken at the line 18—18 on Fig. 14 and viewed in the direction of the arrows.

Figure 19 is an enlarged section taken at the line 19—19 on Fig. 14 and viewed in the direction of the arrows.

Figure 20 is a face view of one of the pair of similar sections of which each of the clamp devices forming elements of the machine, is formed.

Figure 21 is a broken view like Fig. 13 of a portion of a modified form of the machine shown to adapt it for the upsetting of the tie or tension rods, after the steps of the ladder have been assembled with the side bars.

Figure 22 is a plan view of the part of the structure shown in Fig. 21.

Figure 23 is a view, like Fig. 20, of one of the similar sections of the rod-clamps of the machine; and Figure 24, an enlarged broken section taken at the line 24 on Fig. 22 and viewed in the direction of the arrows.

Inasmuch as the invention was devised for use more particularly in the manipulation of step-ladders, I have chosen to illustrate it in this connection, Fig. 12 illustrating, by a view in front elevation, a step-ladder which may be produced by the use of either of the illustrated machines.

To aid in the clear understanding of the way in which the machines operate it may be stated that the step-ladder shown is of the type comprising a riser-section 25 and a rear-leg section 26 hingedly connected together at their upper ends adjacent a platform portion 27 in accordance with common practice. The riser-section 25 is formed of a pair of side bars 28 extending side by side in spaced apart relation and supporting boards 29 shown as set at their ends into gains 30 in the opposite faces of the bars 28, these bars being tied together at intervals, preferably at points closely adjacent to each step-forming board 29, by tension rods 31 provided, as hereinafter described, and in accordance with the invention. As is usual in step-ladders of this type the riser and leg sections 25 and 26 are connected together by a spreader-device 32.

The tension rods 31 each formed of a single length of wire preferably of relatively soft steel and relatively heavy, as for example of No. 7 gauge, extend through openings in the bars 28 with their outer ends upset as represented at 33, preferably with washers 34 surrounding the rods between their upset ends and the adjacent sidebars 28, whereby these rods serve, by their resistance to tension stresses, to prevent spreading apart of the bars 28.

In accordance with one method of procedure the various sections of wire which are to form the tension rods 31 are threaded through the openings in the bar-members 28 and which they are to occupy in the finished structure, the ends of the wire-sections at one side of the bar-members 28 then firmly clamped and their extremities upset, the structure formed of the bar-members 28 and wire sections then inverted and the other ends of the wire sections firmly clamped and then upset. The bars 28 are then spread apart into their desired spaced relation and the boards forming the steps 29 assembled with the bars 28 by sliding them at their ends into the gains 30. The effective length of the tension rods 31 is preferably such that in the applying of the boards forming the steps 29 to place as stated, these rods become tensioned with the manifest advantage.

In accordance with another method of procedure the bars 28 and the boards forming the portions 29 are assembled before the upsetting of the tension-rod-forming sections 31 has been effected, the rods 31, in either case, serving as tension elements to prevent spreading of the side-bars of the ladder structure.

In Figs. 1 to 11, inclusive, I have illustrated a machine suitable for practicing, more particularly, the first of the above-referred-to methods and embodying certain features of the invention.

The machine illustrated comprises a bed-plate 35 shown as supported on legs 36, the bed-plate 35 being provided at intervals therealong with clamp-devices 37 for clamping the upper ends of the wire sections 31, the lower ends of which preferably bear against abutment or positioning surfaces 38 shown as arranged in the form of a series of steps to permit the ends of the wire sections 31 opposite those engaging these abutments (these rod-forming sections being of progressively greater length) to extend at substantially the same height as shown in Fig. 1.

The abutment surfaces 38 are shown as provided on a bar 39 mounted in inclined position on a stationary bar 40 of the machine and guided for lengthwise movement therealong by parallel bars 41 and 42 positioned on top of the bar 40 and located at opposite edges of the latter (Fig. 10) the bar 42 supporting a fourth bar 43 which overhangs the bar 40.

The slide-bar 39 is adapted for lengthwise adjustment either by means of a lever shown at 44 at one end of the machine or a lever shown at 45 adjacent the center of the machine (Fig. 1).

The lever 44, shown as of bell-crank form, is pivoted at 46 to a stationary part 47 of the machine and at 48 to the slide-bar 39 and by rocking this lever the bar 39 is thus shifted in either direction lengthwise of the machine. The lever 45 is pivoted at its inner end, as represented at 49, to a stationary part of the machine and contains a slot 50 into which a pin 51, projecting upwardly from the bar 39, extends (Fig. 3).

As means for accurately positioning the bar 39 in its longitudinal movements the device represented at 39$^a$ is provided this device comprising a socket-member 39$^b$ containing a ball 39$^c$ pressed outwardly by a coil spring 39$^d$ against the upper face of the slide-bar 39 and adapted to enter any one of a series of recesses 39$^e$ provided in the bar 39.

It will be understood from the foregoing that as the bar 40 is supported in an inclined position movement of the slide-bar 39 therealong in one direction moves the surfaces 38 toward the clamping devices 37 and movement of slide-bar 39 in the opposite direction moves the surfaces 38 away from these clamping devices.

Referring now to the clamp device feature of the machine, each clamp-device 37 comprises a stationary section 52 and a movable section 53.

The stationary sections 52 of the clamp-devices, are each formed of a relatively heavy block, or head-portion, 54 secured, as by bolts 55, to the bed plate 35 of the machine, the head, or block, being provided with a horizontally projecting portion 56 forming a support and backing for a block 57 secured thereto by screws 57$^a$ and containing in a face 58 thereof, a vertical groove 59, shown as of V-shape, to receive the upper end of the adjacent rod-section 31, the upper end of this groove opening into a substantially semi-circular recess 60 in the upper portion of the block 57.

The movable clamp sections 53 each comprise a head, or block, 61 confined against longitudinal movement on a reciprocable bar 62 by collars 63 fixed on the bar 62 at opposite sides of each block, or head, 61.

The block, or head, 61 is provided with a laterally extending portion 64 forming a backing and support for a block 65 which directly opposes the adjacent one of the clamp-blocks 56, the clamp-blocks 65 being provided with grooves and recesses as described above and shown of the block 56 at 59 and 60, these grooves and recesses being directly opposed and receiving the end of the rod-sections 31 to clamp the latter when the movable clamp-sections 61 are adjustable into clamping relationship with the stationary clamp-sections 54.

The movable clamp sections 53 are held from moving otherwise than in longitudinal direction with the bar 62, by pins 66 rigidly mounted in each stationary block 54 and extending into bores 67 in the movable block 61 and on which the sections 53 are slidable; and also by similar pins 68 secured to the stationary blocks 57 and projecting into openings 69 in the movable blocks 65.

Extending through the block 65 and into the head 64 are screws (not shown) arranged as shown of the screws 57$^a$, the block 65 having slightly wobbling connection with the head 64 to conformingly fit against the wire-section to be clamped, the block 65 being backed by a rod 64$^a$ threaded in the head 64 and which by its adjustment causes the block 65 to be firmly forced against the wire section when the clamping mechanism is actuated to clamping position.

The bar 62 which extends through the blocks 61 also extends through bores 70 in the stationary blocks 54 in which it is slidable, and is associated with means for reciprocating it for simultaneously moving all of the movable sections 53 toward the stationary sections 54 to condition the clamp devices for clamping the upper ends of the wire sections 31; the means shown comprising a piston and cylinder device 71 the piston of which (not shown) is reciprocated responsive to fluid-pressure, as for example compressed air, supplied to the cylinder at opposite sides, alternately, of the piston as hereinafter described, the piston being pivotally connected at its rod-portion 72 with the upper end of a lever 73 fulcrumed at its lower end on a stationary part of the machine as represented at 74 and pivotally connected between its ends to the rod 62, as represented at 75 adjacent a stationary bearing 62ª in which the rod 62 is slidable.

Opening into opposite ends of the cylinder of the device 71 are pipes 76 and 77 which lead to valve mechanism 79 in communication with a pipe 78 leading from any suitable source of fluid-pressure supply (not shown). The valve mechanism shown may be of any desirable construction to direct the fluid-pressure under the control of the operator alternately into the pipes 76 and 77 and vent the one thereof through which fluid pressure is not passing, and as such valve mechanisms are of well known construction detailed illustration and description thereof appears to be unnecessary. Suffice it to say that the mechanism shown is of the type comprising a treadle lever 80 pivotally connected at its rear end as indicated at 81 to the upper end of a link 82 the lower end of which is pivotally connected at 83 with a stationary part of the support for the valve device 79. The forward end of the treadle lever 80 is pivotally connected at 84 with a rotatable member 85 having a band portion 86 rotatably mounted on a ratchet head 87 secured to the rotatable stem 88 of the valve device 79. The member 85 is provided with a spring pressed dog 89 for cooperating with the ratchet teeth 90 of the ratchet 87, the ratchet having four teeth equidistantly spaced. The mechanism just described operates each time the treadle 80 is depressed to rotate the valve stem 90°. Each 90° rotation of the valve reverses the flow of fluid pressure to the cylinder of the device 71 and vents its opposite end, so that to produce a complete reciprocation of the bar 62, the operator depresses the treadle 80 twice.

It may be here stated that in the assembling of the wire sections 31 with the bars 28 in accordance with the preferred method and as would be practiced by the particular construction of machine now being described, the wire sections 31 are introduced through the registering holes in the bars 28 and the assembled parts applied to the machine to the position shown, in which position the bars 28 rest on angle brackets 91 secured to the bed-plate 35, and the lower ends of the wire sections 31 rest on the stepped abutment surfaces 38, the upper ends of the wire sections 31 extending into the grooves 59 and the recesses 60 of the clamp heads 56 (the movable clamp sections 53 having been moved away from the clamp sections 52) the washers 34 being placed over the upper ends of the wire sections 31 to rest on the bottoms of the recesses 60 and the abutment surfaces 38 being adjusted to cause the upper ends of the wire sections 31 to extend the desired distance above the bottoms of the recesses 60.

To insure the proper positioning of the wire sections 31 in the grooves 59 of the clamp sections 52, the machine is equipped with a slide bar 92 (Figs. 4 and 6) slidable along lateral extensions of the clamp sections 52 and 53 and guided by clips 93 secured to certain of these clamp sections, the bar 92 being provided with a series of horizontally disposed fingers 94 of the same number as the clamp devices 37 and spaced apart along the bar 92 substantially the same distance as the spacing of adjacent ones of the clamp devices, each finger 94, which extends generally lengthwise of the bar 92, being secured at one end to the bar 92 as represented at 95, with its opposite end deflected as shown at 96 to space it from the bar 92 and with its free extremity inclining away from the bar 92 as represented at 97.

The bar 92 is also provided with a series of horizontally disposed fingers 98 located in a plane above the fingers 96 and spaced apart along the bar 92 the same distance as the fingers 96. Each finger 98 is formed of an angle shaped member at one portion 99 of which it is secured to the bar 92, its other portion 100 extending outwardly therefrom, these finger forming portions 100 extending crosswise of the fingers 96 below them.

The bar 92 is shown as provided with a series of pins 101 by which the operator may shift this bar 92. In the operation of the machine after the ladder parts above referred to have been applied to the machine as above stated (the bar 92 having previously been shifted to the right in Fig. 1), the operator shifts the bar 92 to the left in Fig. 1 whereupon the fingers 96 ride against the wire sections 31 the latter becoming interposed between these fingers and the bar 92, and the fingers 98 engage these wire sections as shown in Fig. 6 which results in the wire sections being automatically properly positioned for clamping in the grooved portions of the clamp sections 52 and 53, a stop 102 (Fig. 1) stopping the bar 92 in the correct position.

The operator having manipulated the parts of the machine as stated presses down on the treadle device 80 to condition the valve 79 for introducing fluid pressure into the right-hand end of the cylinder device 71 in Figs. 1 and 2 and venting the left-hand end thereof, whereupon the bar 62 shifts to the left in these figures carrying therewith the heads 64 and firmly clamping the wire sections 31 between the blocks 57 and 65 for holding these wire sections against downward movement during the upsetting operation effected by the mechanism hereinafter explained, the abutment surfaces 38 aiding in the resisting of the downward movement of the wire sections 31 in case there is any slippage of the wire sections in the clamps, it being understood, however, that it is intended the clamps exert sufficient resistance to downward movement of the wire sections which, if the clamps are not employed, would buckle in the end upsetting operation.

The machine also comprises means for upsetting the upper ends of the wire sections 31, these means comprising a plurality of upsetting mechanisms 103 extending in a series lengthwise of the machine and disposed above the clamping devices 37, respectively.

Each mechanism 103 comprises a head 104 containing a vertical opening 105 therethrough in which a cylindrical member 106, vertically alined with the companion grooves of the wire-section-clamping device 37 below it, is rotatable, the member 106 being held against displacement vertically by an annular flange 107 on its upper end and a ring 108 on its lower end. The member 106 contains an opening 109 extending vertically therethrough eccentric of its axis of rotation, the upper portion of this opening being of enlarged diameter to provide a socket portion represented at 110. Reciprocable in the opening through the member 106 is a riveting plunger 111 having a head 112 at its upper end located in the socket 110 and pressed upwardly by any suitable means, as for example by, a coil spring 113, or a rubber tube (not shown) surrounding the plunger 111 and located between the head 112 and the bottom of the socket 110.

It may be here stated that as shown the lower end of the plunger 111 engages the upper end of the wire section 31 to be upset to one side of its central median line and in the operation of the mechanism as hereinafter described for delivering blows to the top of the plunger 111, the member 106 is rotated whereby the plunger 111 travels around the upper end of the wire section causing it to become deformed in upset condition in resemblance to a cone as represented at 114 in Figs. 4 and 8.

The means shown for rotating the members 106 for the purpose stated comprise a worm wheel 115 splined to each member 106 and meshing with a worm 116, the worms 116 being mounted on a shaft 117 extending lengthwise of the machine and rotated by any suitable means, as for example the motor represented at 118, through the medium of the driving belt connection represented at 119, the motor 118 being rigidly secured to a block 120 fastened to, and vertically movable with, a plate member hereinafter referred to and controlling the vertical positioning of the wire section upsetting mechanisms.

Each upsetting mechanism also comprises a head 121 positioned above the head 104 with which it cooperates, the head 121 comprising a bracket member 122, in the overhanging portion 123 of which a reciprocating pneumatically operating upsetting tool device 124 is mounted, the lower impact-producing portion of which and represented at 125, being in vertical alinement with the axis of rotation of the member 106 below it and extending into the upper end of the socket 109 into engagement with the top of the plunger 111.

The tool device 124 may be of any desirable construction as for example as commonly provided for upsetting the ends of rods and shown as of the pneumatically operated type, the hose line for intermittently supplying fluid pressure to the tool device 124 for operating it being represented at 126, the lead lines 126 from the several heads 121 opening into a header 127 connected with a pipe 128 having a flexible section 129 and leading from any suitable source of fluid pressure.

All of the heads 104 are supported on the plate above referred to and represented at 130 as by screws 131, this plate being flatwise secured, as by screws 132, to a plurality of horizontally spaced apart vertical slides 133 having flanges 134 at their opposite edges and guided for vertical movement on uprights 135 rising from the stationary frame of the machine. The uprights contain vertical grooves 136 each partially overlapped by bars 137 secured thereto as by the screws represented at 138, the flanges 134 of these slides extending into the grooves between the uprights 135 and the bars 137 as shown in Fig. 9, whereby the slides 133 are guidingly confined in the uprights for vertical movement thereon, wear bars 139, adjustable by screws 140 on the uprights 135, bearing against the vertical edges of the slides 133.

The heads 121 are secured by screws 141 to vertical plates 142 which are slidable vertically in grooves 143 in the rear faces of the heads 104, with wear plates 144 shown as interposed therebetween, the weight of the slides 142 and the parts carried thereby causing the upsetting tools 124 to bear, by gravity, against the upper ends of the plungers 111 with which they cooperate.

The several upsetting mechanisms described are associated with means by which they may be moved into and out of operative position as desired, the means shown for this purpose comprising a rock shaft 145 journalled in stationary bearings 146 on the uprights 135 and equipped with a hand lever 147; and levers 148 secured to said shaft adjacent its ends, these levers being pivoted, at their forward ends, as indicated at 149, to the upper ends of links 150 the lower ends of which are pivoted at 151 to ears 152 projecting from the plate 130. The levers 148 are provided at their rear ends with weights 153 which operate to rock the shaft 145 into a position in which the several upsetting mechanisms 103 extend upwardly out of operating position, the shaft 145 being operated to lower these upsetting mechanisms to operating position by the operator pulling down on the hand lever 147 which lowers the heads 104 and the heads 123 and forces the plungers 111 downwardly against the upper ends of the wire sections 31.

It is desirable that means be provided whereby the fluid pressure will be automatically supplied to the upsetting mechanisms and current to the motor 118 upon the act of lowering the upsetting mechanisms into operating position as stated and automatically discontinue the supply of fluid pressure and current upon the rise of the upsetting mechanisms out of operating position.

The machine shown involves mechanisms providing for such automatic operations, these mechanisms comprising a valve device represented at 154 at the juncture of the pipes 127 and 128 and involving a rotatable controlling valve member as is common in valve structures, the stem of which is represented at 155, this stem being rigidly connected with one end of an arm 156 the other end of which is slotted and through which slot a pin 157 carried by spaced apart ears 158 projecting from the plate 130, extend. In the lowered position of the upsetting mechanisms shown in Fig. 4 the valve 155 would be open to permit fluid pressure to flow to the pneumatically operated tool devices 124. In the movement of the upsetting mechanisms to raised position following the upsetting operation, the valve 155 is rotated by the arm 156 to arrest the flow of fluid pressure to the tool devices 124.

The operation of the motor 118 is controlled by switch mechanism comprising a switch device 159 secured to the block 120 and having a rocking element controlling the flow of current through the switch 160 as is common in switches, this rock element functioning when swung upwardly to close the circuit of the motor for the supplying of current thereto and when swung downwardly to break the current to the motor. To this end the adjacent upright 135 is provided with a stationary plate member 161 containing a vertical slot (not shown) through which a rocking member 160 extends, the parts being so constructed and arranged that as the plate 130 nears its lowermost movement the rocking member 160 engages the lower end of the slot in the plate 161 which rocks the member 160 for closing the switch thus supplying current to the motor 118 and when the plate 130 nears the limit of its upward movement the rock member 160 engages the upper end of the slot in plate 161 which causes the member 160 to rock into a position for discontinuing the flow of current to the motor.

It will be understood from the foregoing that following the clamping of the wire sections 31 in the clamping devices 37, with the washers 34 applied to the upper ends of these wire sections, as hereinbefore described, the operator pulls down on the lever 147 to position the upsetting mechanism 103 for operation on the upper ends of the wire sections 31, in which operation the reciprocating tool devices 124 are caused to automatically communicate with the source of fluid pressure for operating them and the motor 118 is started into operation for rotating the members 106 which causes the plungers 111 to move around the upper ends of the wire sections to be upset as above explained.

After the ends of the wire sections 31 are upset as stated, the assembly, comprising the bars 28 and the wire sections 31, is inverted, to cause the upset ends of the wire sections to rest on the abutment surfaces 38 and the upper ends of the wire sections then upset above the washers 34 applied to the wire sections 31 as explained of the other ends of these wire sections, the abutment-surface-equipped bar 39, after the first upsetting operation being shifted to the right in Fig. 1 to cause the abutment surfaces 38 to be raised a distance equal to the amount the wire sections were shortened by the first upsetting operation.

Referring now to the machine illustrated in Figs. 13 to 20, inclusive, which constitutes another embodiment of my invention as to certain phases thereof, and is suitable for practicing, more particularly, the method above described in connection with the machine of the preceding figures; this machine comprises a bed plate 162 shown as supported on pedestals 163, the bed plate 162 being provided at intervals therealong with clamp devices 164 for clamping the upper ends of the wire sections 31, the lower ends of which preferably bear against abutment or positioning members 165 which are shown as arranged in the form of a series of steps to permit the ends of the wire sections 31 opposite those engaging these abutments to extend at substantially the same height as shown in Fig. 13.

The abutment members 165 are shown as in the form of blocks mounted on a slide 166 movable lengthwise in a guide, or way, 167 supported in an inclined position on projections 168 provided on the pedestals 163. The slide 166 is shown as connected with lever mechanism by which it may be operated, this lever mechanism comprising a bell crank lever 169 pivoted at its angle as represented at 170, to a bracket 171 on the guide 167 and pivoted at its upper end as represented at 172, to the outer end of a link 173 pivoted at its inner end as indicated at 174 to the slide 166.

It will be understood from the foregoing that as the member 167 is supported in an inclined position movement of the slide 166 therealong in one direction moves the blocks 165 toward the clamping devices 164 and movement of the slide in the opposite direction moves these blocks away from these clamping devices.

Each clamp device 26 comprises a stationary section 175 and a movable section 176. The stationary sections 175 are each formed of a relatively heavy block, or head portion 177 rigidly secured, as by bolts 178, to the bed plate 162 of the machine, the head, or block, 177 being provided with a horizontally projecting portion 179 forming a support and backing for a block 180 containing in a face 181 thereof, a vertical groove 182 to receive the upper end of the adjacent rod section 31, the upper end of this groove opening into a substantially semi-circular recess 182 in the upper portion of the member 180.

The movable clamp sections 176 each comprise a head or block 184 confined against longitudinal movement on a rotatable shaft 185 by collars 186 fixed on this shaft at opposite sides of each block or head 184.

The block or head 184 is provided with a laterally extending portion 187 forming a backing and support for a block 188 which directly opposes the adjacent one of the clamp blocks 180, the clamp block 188 being provided with a groove and a recess as described above and shown of the block 180 at 182 and 183, these grooves and recesses being directly opposed and receiving the end of the rod section 31 to clamp the latter when the movable clamp section 176 is adjusted into clamping relationship with the stationary section 175.

The shaft 185 which extends through, and is journalled in, the several heads or blocks 184, extends rotatably through the heads or blocks 177, one portion of this shaft, the left-hand portion thereof in Fig. 1, being shown as threaded as represented at 189 at which it has screw threaded engagement with a threaded bearing 190 rigidly secured to the bed plate 162, whereby rotation of the shaft 185 in one direction simultaneously moves all of the movable clamp sections 176 toward the stationary sections 175 thereof to condition the clamp devices for clamping the upper ends of the wire sections 31 and rotation of this shaft in the opposite direction shifts said movable sections away from the fixed clamp sections.

A member having a plain journalling surface engaged by the shaft 185 and represented at 191 is secured to the opposite end of the bed plate 162 adjacent to which the shaft 185 is shown as equipped with a hand-wheel 192 by which it may be rotated; the shaft 185 by preference having journal support at the portions thereof which extend through the fixed clamp sections 175.

The movable clamp sections 176 are prevented from rotating on the shaft 185 out of the desired position, by the provision of a rod 193 rigidly mounted in the alined stationary clamp sections 175 and on which rod the movable clamp sections 176 are longitudinally slidable under the control of the shaft 185.

The machine also comprises a mechanism for upsetting ends of the wire sections 31, this mechanism comprising a sectional bracket the sections of which are represented at 194, 195, 196 and 197. The section 194 is pivoted on a pivot pin 198 secured in vertically spaced ears 199 and 200 of a stationary upright 201 secured to the bed plate 150

162 of the machine, and the section 195 is pivotally connected with the outer end of the section 194 by a pivoting pin 202, the pivoting pins 198 and 202 being vertically disposed to adapt the section 194 to swing about a vertical axis on the upright 201 and the section 195 to swing about the section 194 also about a vertical axis.

The outer end of the section 195 is bifurcated to present the vertically spaced arms 203 to the outer ends of which the sections 196 and 197, which are in the form of bars extending parallel to each other, are pivoted as represented at 204 and 205, a coil spring 206 connected with a lug 207 on one of the arms 203 and with a lug 208 on the other end of the section 196, tending to hold the latter in the position shown in the drawings.

The bracket thus provided supports an upsetting tool such as for example of the pneumatically actuated type as represented at 209, the reciprocating tool element of which is represented at 210.

The device 209 is provided with rearwardly extending lugs 211 and 212 to which the outer ends of the bracket sections 196 and 197 are pivoted as represented at 213 and 214, respectively. It will be understood from the foregoing that the spring 206 tends to normally hold the tool device 209 in raised position and that in the use of the same for upsetting the wire sections 31 the tool device 209 would be swung over the ends of these wire portions for registry therewith in succession.

In the assembling of the wire sections 31 with the bars 28, in accordance with the preferred method practiced with this construction, the wire sections 31 are introduced through the registering holes in the bars 28 and the assembled parts applied to the machine to the position shown, in which position the bars 28 rest on pins 215 projecting from the side of the bed 162, the lower ends of the wire sections 31 rest on the stepped series of abutments 165 and the upper ends of the wire sections 31 extend into the grooves 182 and the recesses 183 of the clamp devices as shown (the movable clamp sections 176 being withdrawn to the position shown), the washers 34 being placed over the upper ends of the wire sections to rest on the bottoms of the recesses 183, and the abutments 165 being adjusted to cause the upper ends of the wire sections 31 to extend the desired distance above the bottoms of the recesses 183.

The operator then manipulates the shaft 185 to move the clamp sections 176 into clamping engagement with the wire sections 31 to firmly hold them against downward movement during the upsetting operation effected by means of the tool device 209 as above explained, the abutments 165 aiding in the resisting of the downward movement of the wire sections 31 in case there is any slippage of the wire sections in the clamps; it being understood, however, that it is intended the clamps exert sufficient resistance to downward movement of the wire sections which, if the clamps were not employed, would buckle in the end upsetting operation.

After the upper ends of the wire sections are upset as stated, the assembly, comprising the bars 28 and the wire sections 31, is inverted, to cause the upset ends of the wire sections to rest on the abutments 165 and the upper ends of the wire sections then upset above the washers 34 applied to the wire sections, as explained of the other ends of the wire sections, the abutments 165, after the first upsetting operation and before the second upsetting operation, being raised a distance equal to the amount the wire sections were shortened by the first upsetting operation.

The machine of Figs. 13 to 20, inclusive, as modified according to the showing in Figs. 21, 22, 23 and 24 is adapted for the upsetting of the ends of the wire sections 31 in case it is desired that the tension rods be installed in place after the step-forming portions 29 of the latter have been assembled with the side bars 28. In this construction of machine the clamps represented at 216 and corresponding with the clamps 164 of Fig. 13, extend normal to the position occupied by the clamps 164, each being formed of a stationary section 217 presenting a clamping block of the same construction as the blocks 130, and a movable clamp section 219 having a clamping block 220 as in the case of the clamp sections 176 except that the recesses at the top of these blocks as represented at 183 in the machine of Figs. 13 to 20, inclusive, are omitted and the grooves in these blocks and represented at 221 and 222 are slightly inclined as shown.

The clamp sections 219 are mounted between collars 223 and 224 on shafts 225 slidable in the clamp sections 217 and having rack portions 226, the clamp sections 219 sliding on rods 227 each fixed at one end of the adjacent clamp section 217, to hold the sections 219 against rotation about the shafts 225. The actuating shaft for the movable clamp sections 219, in this construction, is represented at 228 and is journalled on a stationary part of the machine and would be provided with a hand-wheel, as in the case of the shaft 185, for operating it, the shaft 228 being provided at intervals with pinions 229 rigid thereon and meshing with the racks 226 of the shafts 225, respectively, which latter are guidingly confined for reciprocation in bores 230 of housings 231 in which the pinions 229 extend.

In using this form of machine which, it will be understood, may be provided with an upsetting tool device as in the case of the machine of Figs. 13 to 20, inclusive, the ladder parts assembled as shown in Fig. 21, would be applied to the position therein shown to position the upper portions of the wire sections 31 in registration with the registering grooves 221 and 222 of the clamps, the washers 34 being applied to the upper ends of the wire sections 31 which project through openings in the upper one of the bars 28 the upper terminal portions of these wire sections being upset against the washers 34. The assembly of the ladder parts is then inverted and the other ends of the wire sections which thus became uppermost, upset, with the washers about the wire sections, as explained above.

If desired, and by preference, the machine now being described would also be provided with the abutment devices 165 as explained of the construction shown in Figs. 13 to 20, inclusive, which would be adjusted upwardly following the first upsetting operation a distance equal to the shortening of the wire sections by the first upsetting operation.

It will be understood that if desired the machine of Figs. 1 to 13, inclusive, may be modified, to adapt it to upset the wire sections after the assembly of the step forming portions 29 with the side bars 28 as shown in Fig. 21, to cause the clamping devices to extend normal to the plane of the assembled ladder parts instead of lengthwise of the ladder parts, as for example in accordance with the suggested modification shown in Figs. 21, 22, 23 and 24.

While I have described certain particular ways of practicing my improved method, I do not wish to be understood as intending to limit it thereto as the invention may be practiced in other ways and with other machines without departing from the spirit of my invention.

What I claim as new, and desire to secure by Letters Patent, is:

1. The method of assembling tension rods with the side-bars of the riser section of a step-ladder which consists in inserting the rods through the bars which, in the finished article, form said side bars, clamping one end of each rod adjacent its extremity and while so clamped subjecting said last-referred-to ends to force for upsetting them, inverting the structure formed of said bars and so clamping and upsetting the other ends of said rods.

2. The method of assembling tension rods with the side-bars of the riser section of a step-ladder which consists in inserting the rods through the bars which, in the finished article, form said side bars, clamping one end of each rod adjacent its extremity and while so clamped subjecting said last-referred-to ends to force for upsetting them, inverting the structure formed of said bars, so clamping and upsetting the other ends of said rods and thereafter applying the step-forming portions to said bars to extend in the space therebetween.

3. The method of assembling tension rods with the side-bars of the riser section of a step-ladder which consists in inserting the rods through the bars which, in the finished article, form said side bars, clamping one end of each rod adjacent its extremity and while so clamped simultaneously subjecting said last-referred-to ends to force for upsetting them, inverting the structure formed of said bars and so clamping and upsetting the other ends of said rods.

4. The method of assembling tension rods with the side-bars of the riser section of a step-ladder which consists in inserting the rods through the bars which, in the finished article, form said side bars, clamping one end of each rod adjacent its extremity and while so clamped simultaneously subjecting said last-referred-to ends to force for upsetting them, inverting the structure formed of said bars, so clamping and upsetting the other ends of said rods and thereafter applying the step-forming portions to said bars to extend in the space therebetween.

5. The method of assembling tension rods with the side bars of the riser section of a step-ladder which consists in applying the step-forming portions to the bars which, in the finished article, form said side bars, to extend in the space therebetween, inserting the rods through the bars, clamping one end of each rod adjacent its extremity and while so clamped subjecting said last-referred-to ends to force for upsetting them, inverting the structure formed of said bars and said step-forming portions and upsetting the other ends of said rods.

WALTER C. ULINE.